United States Patent [19]

Pertzsch et al.

[11] Patent Number: 4,623,105
[45] Date of Patent: Nov. 18, 1986

[54] VIDEO CASSETTE

[75] Inventors: Albert Pertzsch, Munich; Hubert Brunner, Weil; Ludwig Zeroni, Ottobrunn, all of Fed. Rep. of Germany

[73] Assignee: Agfa Gevaert Aktiengesellschaft, Leverkusen, Fed. Rep. of Germany

[21] Appl. No.: 802,234

[22] Filed: Nov. 27, 1985

[30] Foreign Application Priority Data

Dec. 8, 1984 [DE] Fed. Rep. of Germany ....... 3444861

[51] Int. Cl.[4] .......................... G03B 1/04; G11B 15/32
[52] U.S. Cl. ..................................... 242/198; 360/132
[58] Field of Search ............................... 242/197–200; 360/132, 137, 96.1; 352/72, 78 R

[56] References Cited
U.S. PATENT DOCUMENTS
4,512,534 4/1985 Coy, Jr. et al. ..................... 242/198

FOREIGN PATENT DOCUMENTS
2910783 9/1979 Fed. Rep. of Germany ...... 242/198

Primary Examiner—Leonard D. Christian
Attorney, Agent, or Firm—Connolly and Hutz

[57] ABSTRACT

A video cassette with two reels which are arranged in plane-parallel fashion for winding and unwinding a magnetic tape and with a locking mechanism consisting of a pivotal two-armed pawl for each reel which can be slipped on a support. One lever arm engages in a toothed reel flange in the inoperative position of the cassette and the other lever arm rests on the disengaging component of a vertically rotatable release lever. The locking mechanism also includes moulded pre-tensioning arms, the deflection points of the pre-tensioning arms rigid with the housing at the support lie close to the rotational axis of the pawl.

7 Claims, 5 Drawing Figures

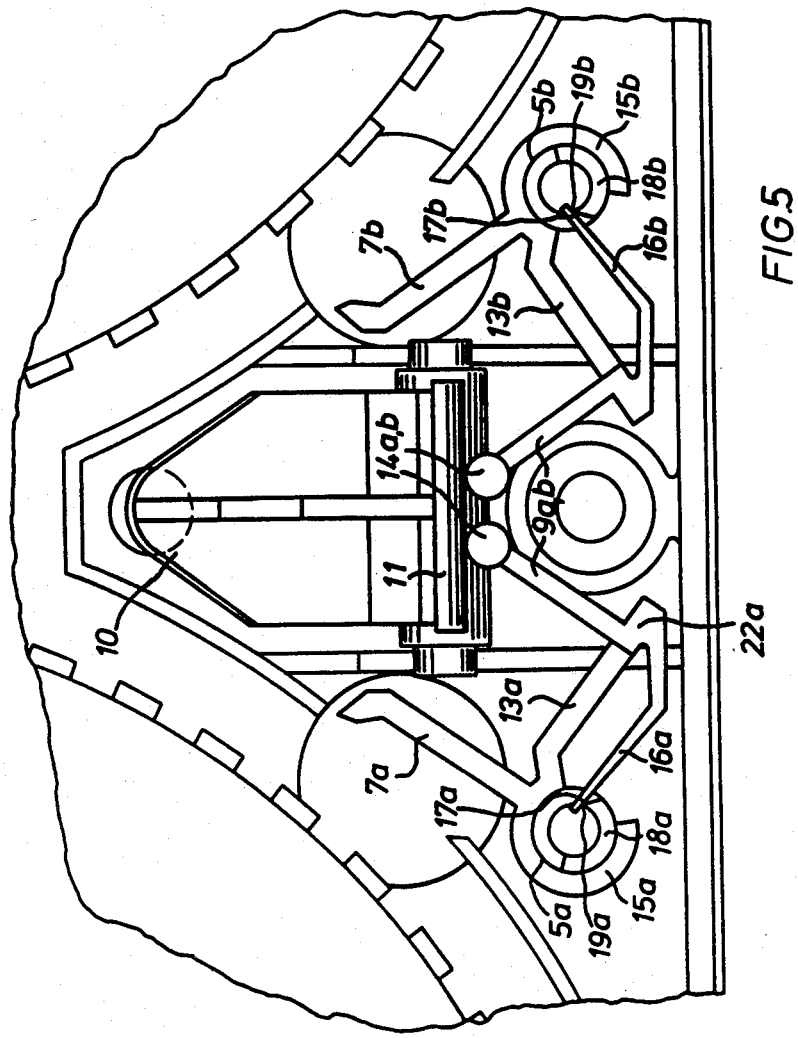

VIDEO CASSETTE

The invention relates to a video cassette with a locking mechanism in which the pawls connected to the moulded pre-tensioning arms, as a substitute for the wire springs, have a particular geometric shape.

Conventional commercial video cassettes contain two plane-parallel tape reels on which the magnetic tape is wound and unwound. For playback on the recorder, the tape is pulled from the cassette. To prevent the reel of tape from loosening when not being used, the cassettes contain locking devices. The flanges of the reel adjacent to the cassette base have teeth round their periphery. The pivotally mounted pawls themselves consist of two-armed levers of which one arm rests on a toothed reel when not in use any of which the second arm rests on a release lever. The pre-tensioning of the pawls is provided by means of a wire spring for each of the two pawls. One end of the spring acts on a lever arm while the other end rests on a pin. The use of wire springs has an adverse effect on the production costs of the video cassette as the springs necessitate storage, quality control etc. Installation is also difficult owing to the restricted space inside a cassette. In order to avoid these disadvantages, various methods have already been proposed for replacing the wire springs by injection moulded plastic springs on the pawls.

Thus, curved pretensionsing arms made of plastic which, on the one hand, are injection moulded on the lever arm of the pawl and, on the other hand, rest on the interior of the cassette have been described GB No. 2 754 935. The same applies to U.S. Ser. No. 795,867 filed 11-7-85. In DE No. 28 37 886, a single sprung plate with one flat part and two curved parts is used instead of wire springs. The flat part rests on the lateral wall of the lower part of the housing and the curved regions touch the pawls. In U.S. Ser. No. 407,501 filed 8-12-82 and GM No. 81 21 098, a resilient plastic arm which rests against a stationary pin or on the interior of the cassette is injection moulded on the pawls. A single curved plastic arm is used in GB No. 20 99 400 or U.S. Pat. No. 4,232,840. The two ends are injection moulded on the two adjacent lever arms of the pawls while the curved part presses against the internal wall of the cassette housing.

In all the above mentioned cases, a relatively large bending stress is required when the plastics springs are actuated, i.e. the springs must also have a relatively thin cross-section for reasons of elasticity and this results in premature material fatigue.

To avoid these disadvantages, it is necessary to reduce the bending stress of the spring elements or pre-tensioning arms.

According to the present invention there is provided a video cassette with two reels which are arranged in plane-parallel fashion for winding and unwinding a magnetic tape and with a locking mechanism consisting of a pivotal two-armed pawl for each reel which can be slipped on a support, a lever arm meshing in a toothed reel flange in the inoperative position of the cassette and the other lever arm resting on the disengaging component of a vertically rotatable release lever, and of one moulded pre-tensioning arm each, wherein the deflection point of the pre-tensioning arm rigid with the housing at the support lies close to the rotational axis of the pawl. Preferably, the distance between the point of deflection and the rotational axis of the pawl is smaller than the radius of the support.

This short physical lever length produces a suitable force for actuating the pawl in the locking and release position with a relatively large spring cross-section. For reliability in operation, it is of considerable importance to prevent premature fatique of the plastics material owing to the small deflection of the pre-tensioning arm.

A preferred embodiment of the invention will now be described in more detail by example only with reference to the accompanying drawings, in which:

FIG. 5 shows a partial plan view according to FIG. 2 with the pawls according to the invention in the release position.

Figure 1:
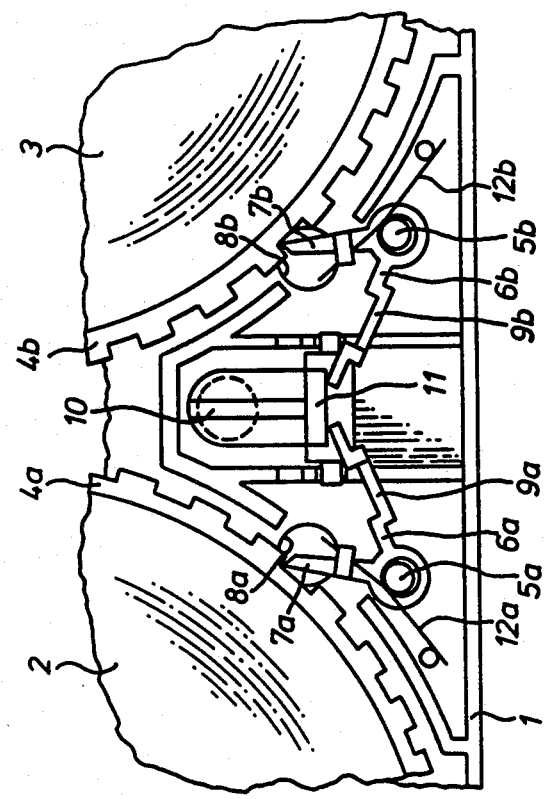
FIG. 1 shows a partial plan view of the lower portion of a video tape cassette housing corresponding to the prior art with pawls and pre-stressed wire springs.
Figure 2:
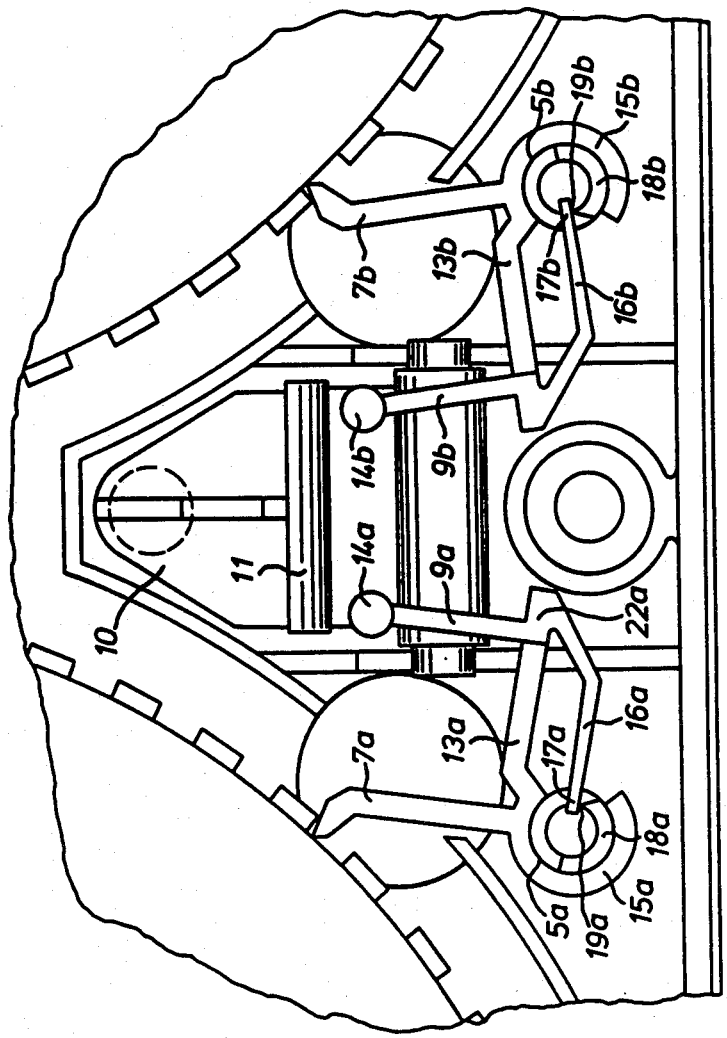
FIG. 2 shows a similar partial plan view with the pawls according to the invention in the locking position.
Figure 3:
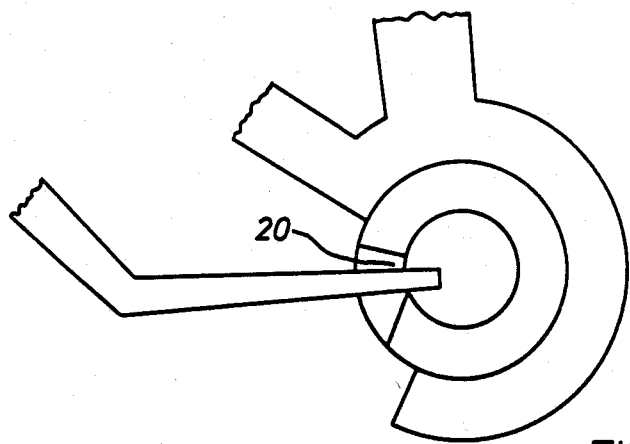
FIG. 3 shows a partial plan view with slotted cylindrical support end.

FIG. 1 shows a partial plan view of a lower housing portion 1 of a conventional video cassette with two tape reels 2, 3 of which the lower reel flanges 4a, 4b are toothed. The cassette also contains a locking mechanism with a pivotal pawl 6a, 6b which can be placed on the respective support 5a, 5b. One lever arm 7a, 7b thereof (also called first lever arm) prevents undesirable rotation of the reels during engagement between the teeth of the reel flange. The pivoting range of the first lever arm on the reel is restricted by the enclosed circle 8a, 8b—a circular recess in the cassette base. The other lever arm 9a, 9b (also called second lever arm) rests on the disengaging component 11 of the release lever 10. Conventional wire springs 12a, 12b of which one end rests on the first lever arm and the other end on a pin are used for pre-tensioning the locking mechanism. As shown in FIG. 2, the main feature of the invention involves not only replacing the wire springs by a leaf spring made of plastics material (also called pre-tensioning arm), but also giving all the pawls a particular geometric form which allows minimum deflection of the pre-tensioning arm when pivoting the pawls. For this purpose, the two lever arms 7a, 7b and 9a, 9b are connected by a web 13a, 13b which runs perpendicularly to the lever arm. The lever arms and the web produce a U-shape. The distance between the lever arms is selected such that, in order to fullfil their function (FIG. 2) the first lever arm engages between the teeth of the lower reel flange in the locking position and the free end of the second lever arm rests on the disengaging component 11 of the release lever 10. To allow the lever arms to unwind freely when the release lever is deflected, the free end 14a, 14b of the lever arms is rounded. The pawl unit is moulded on a slip-on sleeve 15a, 15b which is slipped on the support 5a, 5b which may be of hollow cylindrical design. This particular geometric form of the pawls is selected to allow a maximum effective spring length for the pre-tensioning arm 16a, 16b. The pre-tensioning arm is moulded on the second lever arm and is sufficiently long for its free end 17a, 17b to rest on the support which is of a particular design. The support itself can be designed as a bolt or as a sleeve of which the height is equal to that of the first lever arm. To enable it to be used as a rest for the pre-tensioning arm, the free support end is therefore half cylindrical 18a, 18b (FIG. 2) in shape. One of the two planes of section of the hollow cylindrical body is bevelled in such a way that the pre-tension arm only rests on the internal edge 19a, 19b thereof. This is a method of preventing the actuating force exerted on the pre-tensioning arm during pivoting of the pawls from becoming too strong. If the support end is annular in design, a slot 20 (FIG. 3) is sufficient for the pre-tensioning arm to rest on.

Figure 4:
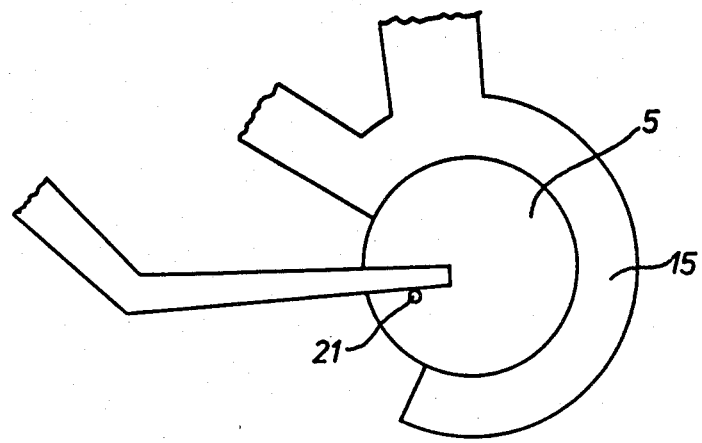
FIG. 4 shows a partial plan view of a pawl according to the invention with a pin moulded at the support end.

One of the two planes of section should be bevelled, as mentioned above. If the height of the support 5 is equal to that of the slip-on sleeve 15 of the pawl, a pin 21 arranged eccentrically on the support end (FIG. 4) can act as a rest. The second lever arm 9a is generally higher than the first one and can be L-shaped 22a at its lower end. The pre-tensioning arm is joined on the short side of the lever arm thereby increasing its effective length.

FIGS. 2 and 5 show the particular advantage of the invention. FIG. 2 shows the pawls in engagement and FIG. 5 shows the pawls in the release position. As shown, the pivot of the pawls and the deflection point of the pre-tensioning arms are very close to each other. The thickness of the pre-tensioning arm material can therefore be relatively thick relative to the solutions mentioned at the beginning of the description and this eliminates premature fatigue of the plastics material. A further advantage of the pawls according to the invention lies in the fact that they can be incorporated into the lower housing portion of a conventional commercial cassette, in which case it is only necessary to provide the rest for the pre-tensioning arm. This can be provided without great effort by injection moulding.

We claim:

1. A video cassette with a housing vertically rotatable release lever and two flanged reels which are arranged in plane-parallel fashion for winding and unwinding a magnetic tape having a support pin adjacent to but spaced from each reel, and with a locking mechanism consisting of a pivotal two-armed pawl for each reel positionable on one of the pins, teeth formed in the flange around the periphery of each reel, said pawls each comprised of a first reel engaging lever arm engageable in the teeth positioned on the reel flange in the inoperative position of the cassette, and a second lever arm having an end resting on the disengaging component of the vertically rotatable release lever in said cassette, said two lever arms being connected by a transverse web, wherein said transverse web extends perpendicularly to and between the two lever arms the second lever arm of each pawl having one end resting on the disengaging component of the release is formed in an L-shape at the other end a pre-tensioning arm is formed on the short side of the L-shaped other end of the second lever arm which pre-tensioning arm has a free end, said free end rests on a deflection point rigidly integral with the cassette housing, the distance between the point of deflection and the rotational axis of the pawl is smaller than the radius of the pin.

2. A video cassette according to claim 1, wherein the support pin has a free end formed as a half-cylinder.

3. A video cassette according to claim 1, wherein the pin has the form of a sleeve and a free end of the pin has a slot.

4. A video cassette according to claim 3, wherein the deflection point is arranged only on the internal periphery of the sleeve.

5. A video cassette according to claim 1, wherein the point of deflection is an eccentrically arranged surface on the support pin.

6. A video cassette according to claim 1, wherein the part of the pre-tensioning arm opposite to its free end is curved for more than 90 degrees.

7. A video cassette according to claim 1, wherein the first lever arm of each pawl resting on the disengaging component of the release lever is rounded at its free end.

* * * * *